United States Patent [19]

Davis

[11] Patent Number: 6,081,080
[45] Date of Patent: Jun. 27, 2000

[54] METHOD AND APPARATUS FOR REDUCING VOLTAGE STRESSES IN ELECTRIC MACHINES

[75] Inventor: Rex Mountford Davis, Loughborough, United Kingdom

[73] Assignee: Switched Reluctance Drives, Ltd., United Kingdom

[21] Appl. No.: 08/999,785

[22] Filed: Nov. 20, 1997

Related U.S. Application Data

[63] Continuation of application No. 08/478,249, Jun. 7, 1995, abandoned.

[30] Foreign Application Priority Data

Apr. 10, 1995 [GB] United Kingdom .................. 9507445

[51] Int. Cl.$^7$ ...................................... H02P 5/50
[52] U.S. Cl. ........................... 318/71; 318/439; 318/807; 318/782; 318/138; 318/254; 318/812; 318/456; 318/479; 318/504
[58] Field of Search .................... 318/138, 254, 318/439, 807, 812, 782, 456, 479, 504, 71; 310/314, 51, 168

[56] References Cited

U.S. PATENT DOCUMENTS

| | | | |
|---|---|---|---|
| 3,878,412 | 4/1975 | Kurpanek | 310/51 X |
| 4,041,373 | 8/1977 | Maringer | 310/314 X |
| 5,495,376 | 2/1996 | Wasson et al. | 318/138 X |

OTHER PUBLICATIONS

Y. Murai, et al., "Protection of Motor from Switching Surge by Vacuum Switch," *IEEE Transactions on Power Apparatus and Systems*, vol. PAS–93, No. 5, Sep./Oct. 1974, pp. 1472–1477.

Rhode Nelson and Gary Skibinski, Allen Bradley Co., Inc., *Solutions To Motor Insulation Failures*, Power Transmission Design, Aug. 1995.

Potoradi et al., *Transient Overvoltages Caused by Switching of High Voltage Asynchronous Machines and their Distribution in Stator Windings*, Sep. 5–8 1994, pp. 649–; vol. 2, Proc. Int. Conf. on Electrical Machines, Paris.

Bonnett, A., *Analysis of the Impact of Pulse–Width Modulated Inverter Voltage Waveforms on A.C. Induction Motors*, U.S. Electrical Motors Division of Emerson Electric.

Takahashi et al., *Motor Lead Length Issues for IGBT PWM Drives*, Conf. Record of 1995 IEEE Annual Pulp and Paper Technical Conference, IEEE Cat No. 95CH3572–5, pp. 21–27.

Cornick & Thompson, *Steep–fronted Switching Voltage Transients and their distribution in motor windings Part 1: System Measurements of steep–fronted switching voltage transients; Part II: Distribution of steep–fronted switching voltage transients in motor windings*, Mar. 1982, pp. 45–63, IEEE Proc. vol. 129, Pt.B. No. 2.

*Primary Examiner*—Karen Masih

[57] ABSTRACT

A method and apparatus for reducing winding failures in electric machines resulting from the application of high frequency or high dV/dt voltage pulses or voltage signals to the phase windings of the machine in which an inductive element is provided between the source of the high-frequency or high dV/dt pulses and the phase winding to absorb a portion of the voltage stresses on the phase windings that result from the application of the high-frequency or high dV/dt pulses to the machine.

16 Claims, 9 Drawing Sheets

METHOD AND APPARATUS FOR REDUCING VOLTAGE STRESSES IN ELECTRIC MACHINES

This application is a continuation of application Ser. No. 08/478,249 filed Jun. 7, 1995. Abandoned Jun. 29, 1998.

FIELD OF THE INVENTION

The present invention relates to methods and structures for reducing voltage stresses and winding failures in electric drive systems.

BACKGROUND OF THE INVENTION

Figure 1:
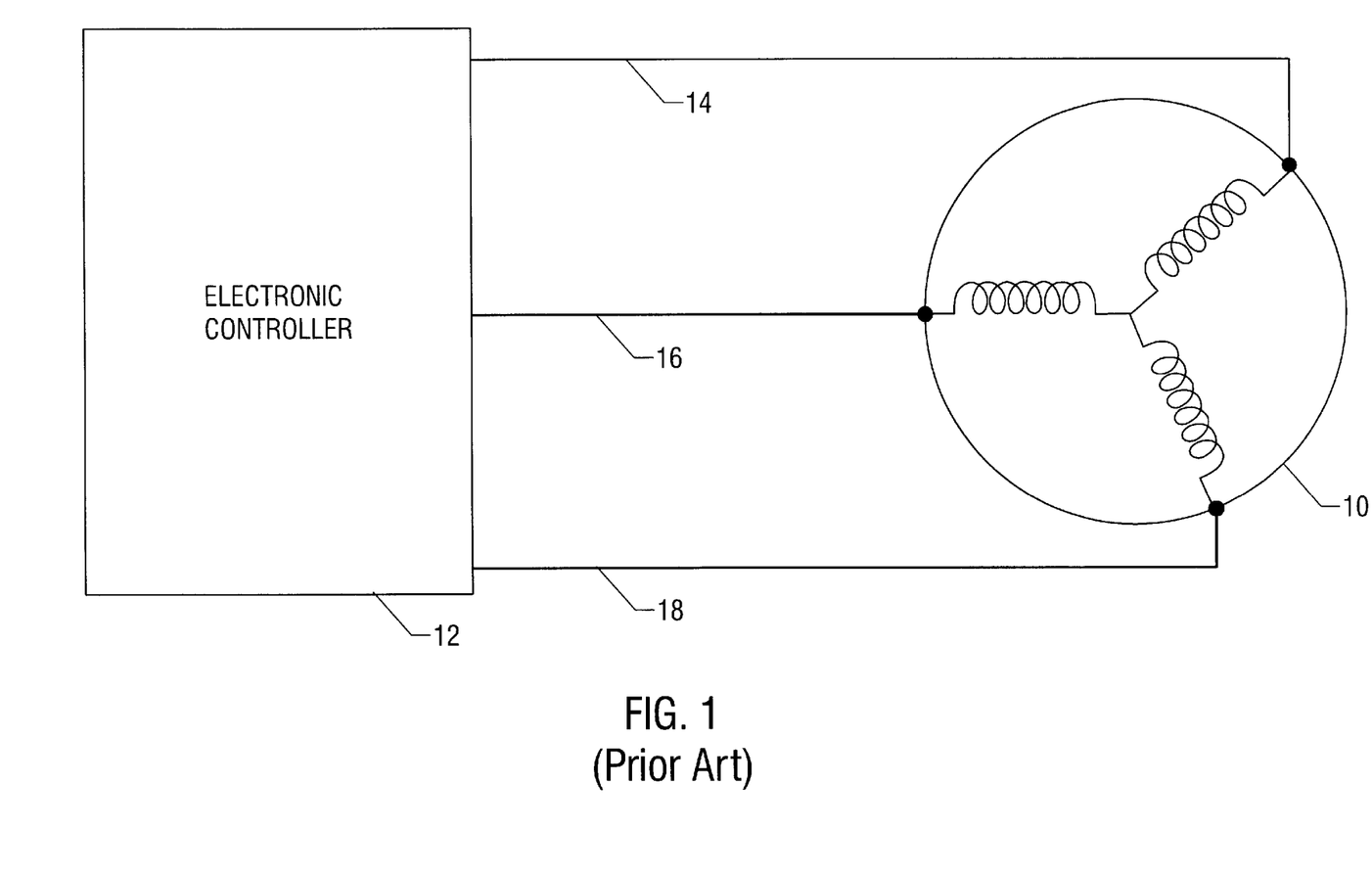
FIG. 1 illustrates an exemplary adjustable speed motor system which may be used in connection with the methods and apparatus of the present invention.

Adjustable speed motor systems typically involve the use of specially designed electronic motor controllers coupled to the phase windings of a multi-phase motor via connection cables. An exemplary arrangement is illustrated in FIG. 1 where a three phase motor 10 is coupled to an electronic controller 12 by three connection cables 14, 16 and 18. In operation, cables 14, 16 and 18 act as transmission lines for signals, which may take the form of voltage waveforms, provided by the electronic controller 12 to the motor 10.

In many systems, the electronic controller 12 controls the speed or torque of the motor 10 through the application of high frequency voltage pulses to the motor 10 via the connection cables 14, 16 and 18. The frequencies of these applied pulses can be quite high and are often in the kilohertz range. Pulse frequencies of the order of 20 kHz are particularly common, as the operation of switching devices at such speeds does not produce audible noise. The high frequency pulses often take the form of voltage waveforms having steep edges where the voltage changes abruptly from a relatively low voltage level to a relatively high voltage level (or vice versa) over a short period of time. The rate of change of the applied voltage over time is mathematically represented by the notation dV/dt. The steeper the edges that define the voltage pulses of the voltage waveform, the higher the value of dV/dt.

The nature of the phase windings in most electric motors causes the motor to appear as a highly inductive load to the connection cables 14, 16 and 18 coupling the motor 10 to the controller 12. At the high switching frequencies and high dV/dt of modern controllers, the inductive load of the motor appears, at least transiently, as an open circuit. Accordingly, the application of high frequency voltage pulses with steep edges (i.e., a high dV/dt) to the motor can result in extreme voltage transients at the points where the connection cables 14, 16 and 18 are coupled to the phase windings. In some systems, the magnitude of these transient voltages can rise to nearly twice the magnitude of the applied voltage pulses.

In new motors, the insulating coating (e.g. of enamel) covering the wiring comprising the phase windings is generally sufficient to handle the voltage spikes caused by the application of the high frequency or high dV/dt voltage pulses. Over time, however, the insulating properties of the enamel wire coating degrade and a point may be reached where it is no longer capable of handling the voltage spikes resulting from the high frequency or high dV/dt pulses. In such instances, the failure of the insulating coating can result in a shorting of winding turns when voltage stresses caused by the high frequency or high dV/dt pulses are applied to the phase winding. Experience has shown that this shorting of winding turns occurs most often in the turns physically adjacent the point where the connection cable is connected to the phase windings. These shorted turns can create a closed circuit where circulating currents are produced. These circulating currents give off heat that tends to further degrade the insulating properties of the wire comprising the shorted turns and the winding turns physically adjacent the shorted turns. This heat, in turn, results in additional insulation failures, which result in additional shorted turns. A vicious cycle is instigated which usually results in extreme damage to the motor winding and failure of the motor itself.

The problem of voltage stress induced winding failures is recognized within the motor art and has been addressed, for example, in D. Potoradi et. al, "Transient Overvoltages Caused by Switching of High Voltage Asynchronous Machines and their Distribution in Stator Windings," 2 *Proceedings of the International Conference of Electrical Machines* 644–49 (Sep. 5–8, 1994) and K. J. Cornick et al., "Steep-fronted Switched Voltage Transients and their Distribution in Motor Windings" 136 *IEE Proceedings* 45–55 (March 1982).

The problem of voltage stress induced winding failure can occur in any motor system in which high frequency or high dV/dt voltage pulses are applied to a motor. In particular, this problem can appear in AC induction motor systems, permanent magnet motor systems, and reluctance motor systems. To date, efforts to resolve this problem have not been adequately successful. This invention provides a solution to the winding failure problem applicable to all electric motor systems.

SUMMARY OF THE INVENTION

The present invention provides a method and apparatus for relieving voltage stresses, and thereby reducing the risk of winding failures, in electric machines by providing an inductive element between the electronic controller and the phase windings of the machine. This inductive element absorbs a significant portion of the voltage stresses that are produced as a result of high frequency or high dV/dt voltage pulses applied to or associated with the machine windings. The inductive element is provided at a location within the drive system better able to handle the voltage stresses than the phase winding of the machine. Because the voltage stresses are no longer concentrated in the phase winding, the incidence of winding failures is reduced.

In one embodiment of the present invention a ferromagnetic member, such as a ferrite ring, is positioned physically near to and surrounding a portion of the connection cables coupling an electronic controller to an electric machine. This ferro-magnetic member locally increases the inductance of the connection cable, producing an inductor which absorbs a portion of the voltage stresses produced when high frequency or high dV/dt voltage pulses are applied to or present in the machine.

In another embodiment of the present invention, winding failures in an electric machine are reduced by adding an inductive member to the portion of a connection cable coupled to a machine. In this embodiment, the inductive member absorbs voltage stresses produced by the high frequency or high dV/dt voltage pulses associated with the machine. In a still further embodiment of the present invention, an electric machine is provided which comprises at least one phase winding and an inductive element connected to an end of the phase winding which is adapted for connection to an electronic controller.

In a still further embodiment of the invention, an inductive member is placed at the end of the connection cable physically near an electronic controller used to control a machine. The inductive member, along with the capacitance of the connection cable, forms a filter in which the inductive member absorbs a substantial part of the steep voltage emanating from the controller, and thus the dV/dt in the connection cable and machine is substantially reduced. This reduction means that the voltage stress in the machine is substantially reduced.

BRIEF DESCRIPTION OF THE DRAWINGS

The present invention can be put into practice in various ways, some of which are described by way of example with reference to the accompanying drawings in which.

Similar reference characters indicate similar parts throughout the several views of the drawings.

DETAILED DESCRIPTION OF THE INVENTION

For the sake of convenience, the following description refers to reluctance motors. The skilled person will be aware that the construction of a switched reluctance generator is the same as that of a switched reluctance motor. Thus, the invention is applicable to both generators and motors to substantially equal effect. Furthermore, the invention is not restricted to use on reluctance machines but is useful in relieving voltage stresses on other types of electrical machines, such as induction machines, synchronous machines and other types of electrical machines in which voltage stress occurs.

Figure 2A:
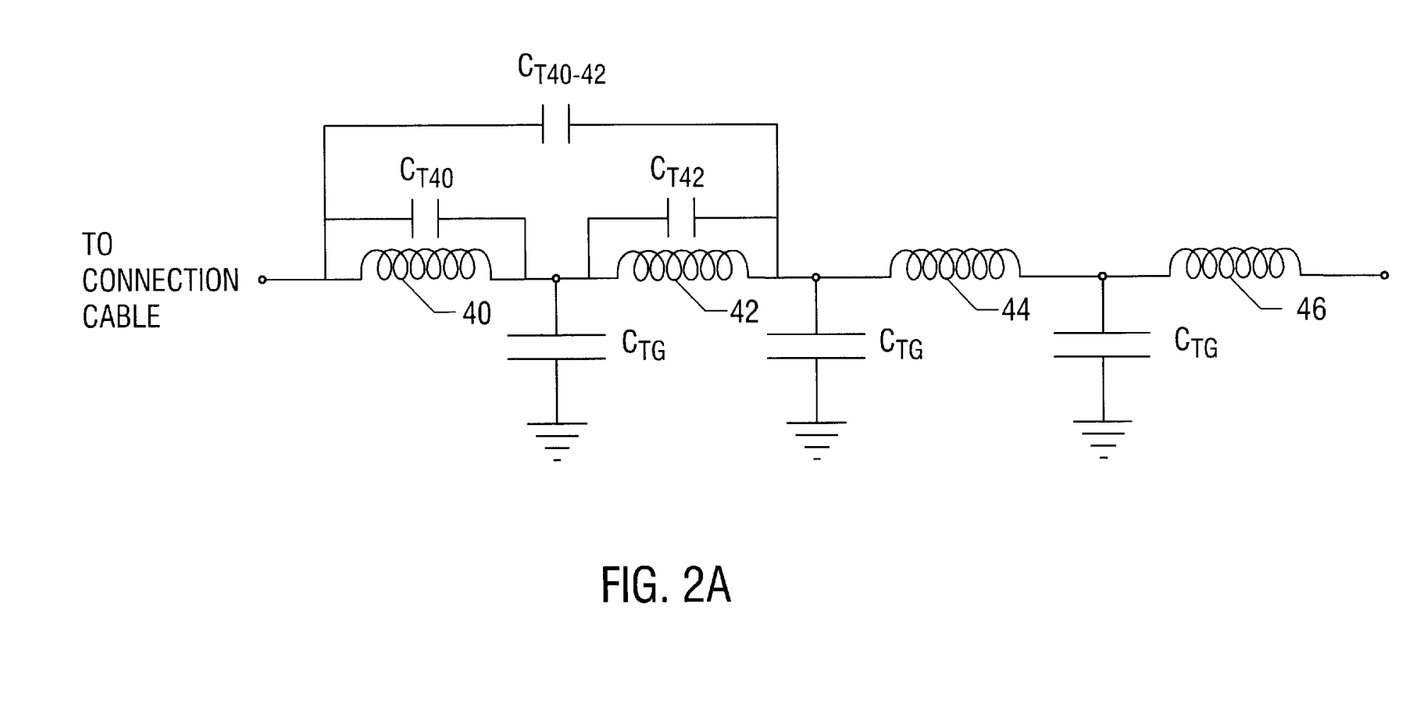
FIG. 2A illustrates a simplified schematic representation of the first portion of a phase winding of a typical electric machine.

FIG. 2A provides a simplified equivalent circuit of the first portion of a phase winding in an electric machine, which may be, for example, a switched reluctance machine or an induction machine. For convenience, the machine in FIG. 2A is referred to as a motor. Generally, the phase winding is represented as a number of series connected inductors 40, 42, 44 and 46. Each of these inductors represents a number of winding turns. Associated with each of these inductors are a number of capacitive elements. These capacitive elements represent the capacitances inherent in windings in a motor. Capacitors $C_{TG}$ represent the turn-to-ground capacitance resulting from the winding turns interaction with the stator material around which the phase windings are wound. This stator material is normally coupled to ground. For motors where the stator material is not connected to ground, the turn-to-ground capacitive $C_{TG}$ is the turn-to-stator material capacitance. Capacitor $C_{T40\text{-}42}$ represents the inherent capacitance between neighboring groups of winding turns. Although not illustrated, similar capacitances are associated with the winding turns represented by inductors 44 and 46. Capacitors $C_{T40}$ and $C_{T42}$ represent the turn-to-turn capacitance resulting from the winding turns interaction with each other. Similar capacitances are associated with the winding turns represented by inductors 44 and 46. As those skilled in the art will recognize, FIG. 2A illustrates only a portion of the capacitances appearing in motor winding arrangement.

The inventor of the present invention has recognized that the combined effect of the capacitances discussed above ensures that the worst voltage stresses caused by the high frequency or high dV/dt voltage pulses occur in the first few turns of the phase winding following the coupling of the phase winding to the connection cable. These turns are referred to hereafter as "the first few winding turns".

Figure 2B:
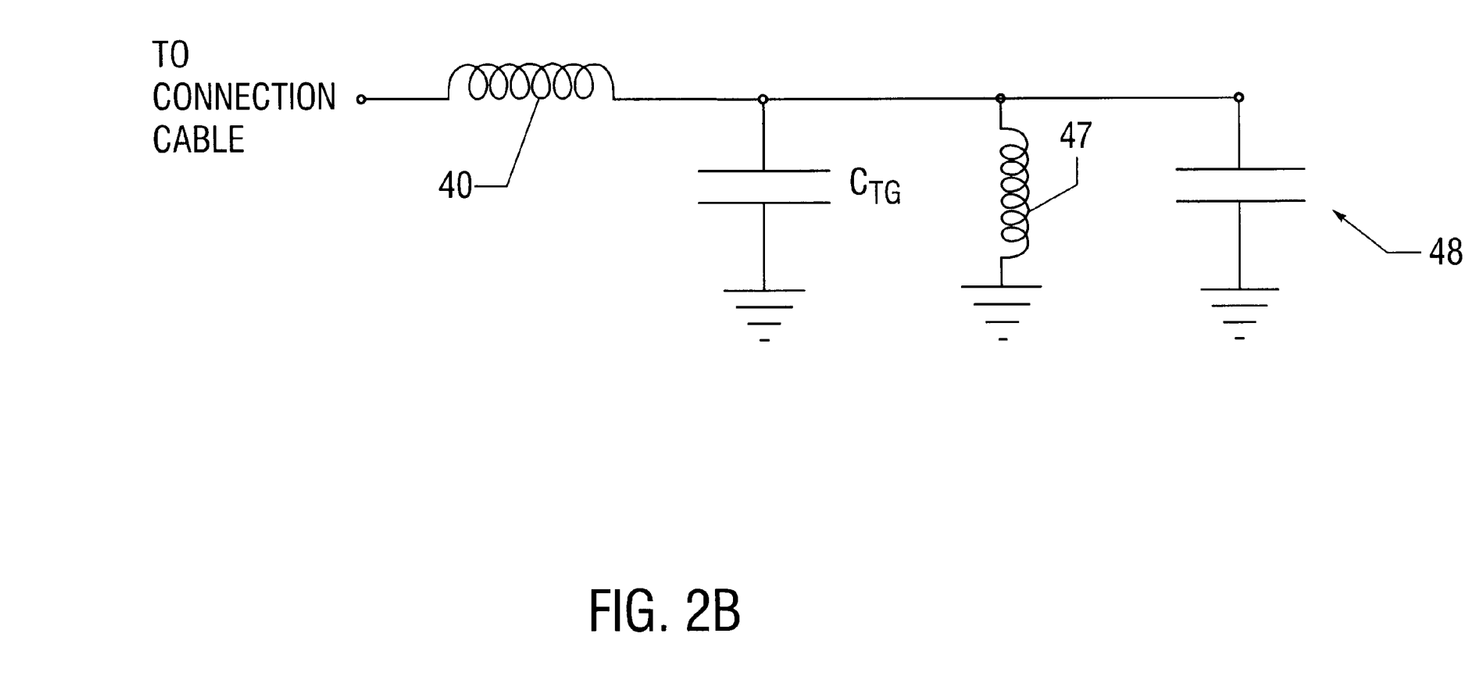
FIG. 2B illustrates a further simplified schematic representation of the first portion of a phase winding of a typical electric machine.

FIG. 2B illustrates a further simplified representation of the first portion of a phase winding of a typical electric motor. The inductances and capacitances of the winding turns other than the first few winding turns are combined for purposes of illustration and are represented by an inductor 47 and a capacitor 48. As in FIG. 2A, the inductor 40 represents the inductance of the first few winding turns and the capacitor $C_{TG}$ represents the turn-to-ground capacitance of the first few winding turns.

Because of the nature of inductive and capacitive circuits, the magnitude of the voltage stress on the inductor 40 when a voltage pulse is applied to the winding will vary with the capacitance of the capacitor $C_{TG}$. As the capacitance of capacitor $C_{TG}$ increases, the voltage stress placed on the inductor 40 increase. As the capacitance of capacitance $C_{TG}$ decreases, so does the voltage stress on inductor 40. This reduction in voltage stress occurs because, as $C_{TG}$ is lowered, the voltage stresses are distributed between the inductors 40 and 47.

From the above analysis of the simplified circuit of FIG. 2B it follows that a reduction in the turn-to-ground capacitance of the first few winding turns of a motor winding should result in a reduction of voltage stresses placed on that portion of the motor phase winding, and a corresponding reduction in the likelihood of a voltage stress induced failure of the phase winding. A novel approach for reducing the turn-to-ground capacitance of the first few winding turns of phase winding in a switched reluctance motor is disclosed in the related co-pending application by the same inventor entitled "METHOD AND APPARATUS FOR REDUCING WINDING FAILURES IN SWITCHED RELUCTANCE MOTORS," filed Jun. 7, 1996, Ser. No. 08/473,290.

In addition to the novel method of distributing voltage stresses throughout a motor phase winding, as disclosed in the referenced application, the present inventor has discovered that it is also possible to reduce winding failures by concentrating the voltage stresses at a point outside of the phase windings of a motor. This aspect of the present invention is illustrated in FIG. 3.

Figure 3:
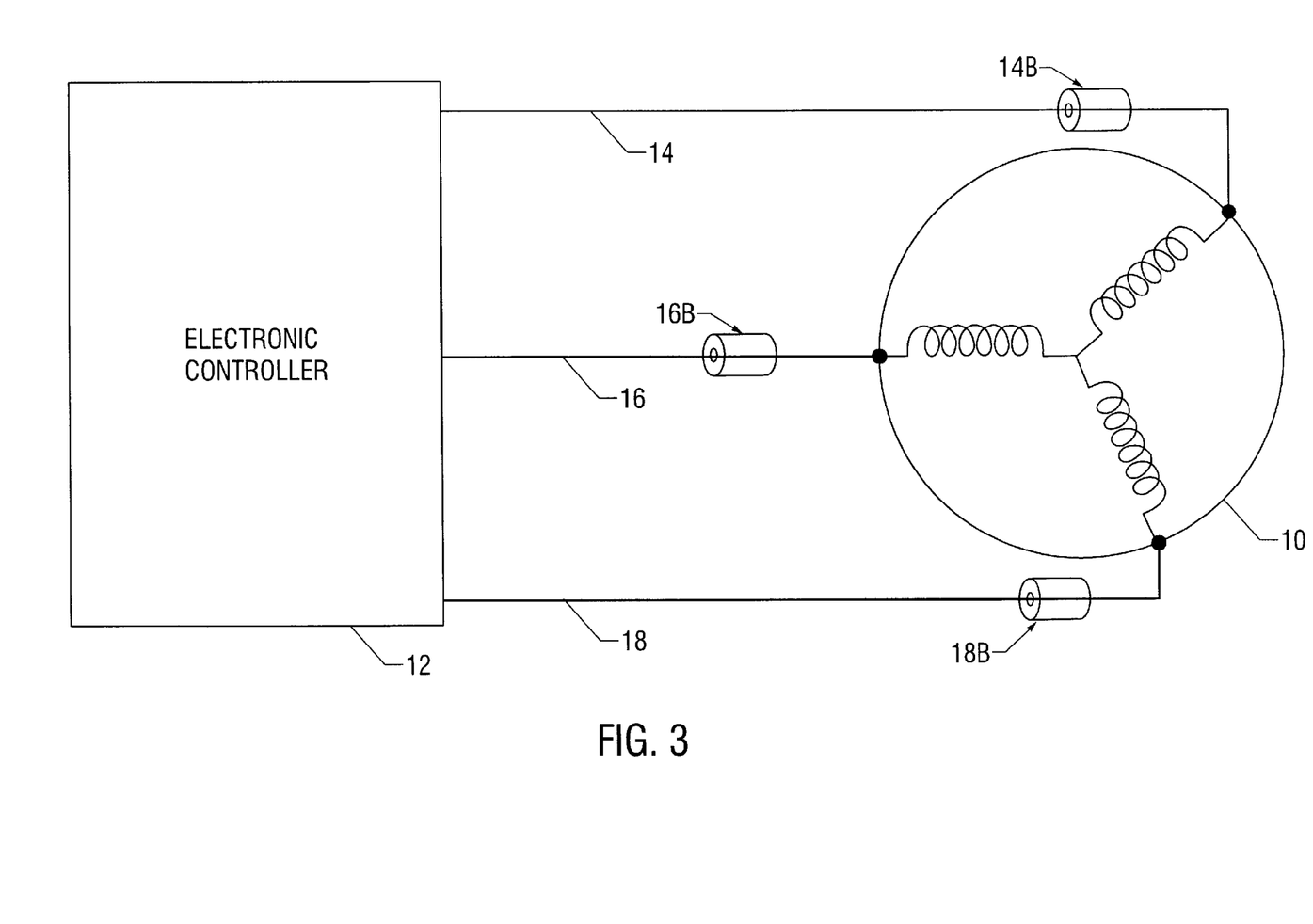
FIG. 3 generally illustrates the use of ferrite rings to reduce electric machine winding failures in accordance with the present invention.

FIG. 3 generally illustrates the electronic controller 12 of FIG. 1 coupled to a multi-phase electric motor 10 via connection cables 14, 16 and 18. Positioned around the motor ends of the connection cables 14, 16 and 18 are ferrite rings 14b, 16b and 18b. These ferrite rings result in an increased inductance in the connection cable at the point at which the rings are positioned. By proper positioning and sizing of the ferrite rings in accordance with the present invention, it is possible to reduce the risk of winding failures in the motor 12.

Figure 4:
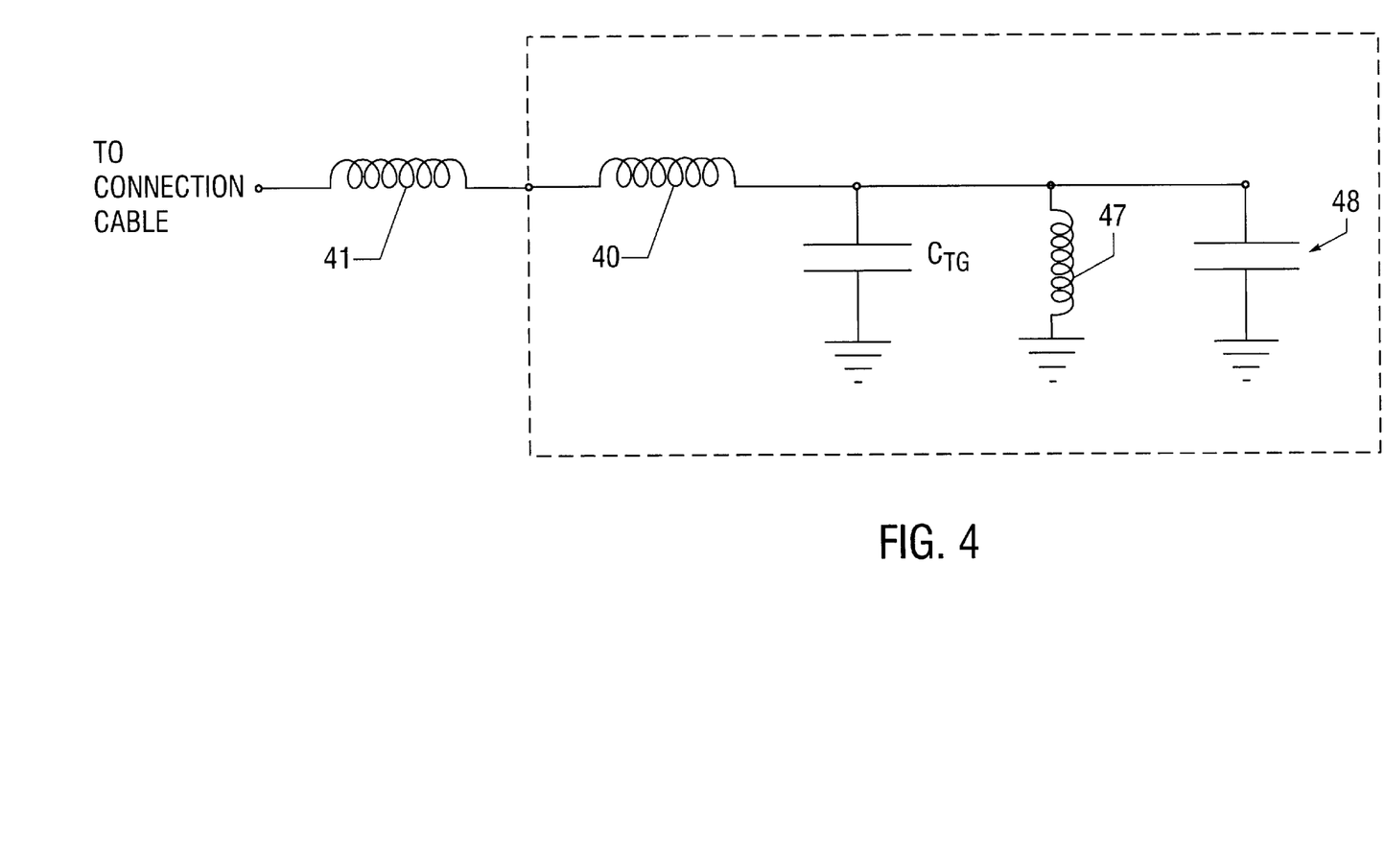
FIG. 4 generally illustrates a simplified schematic representation of an electric circuit resulting from the practice of the present invention as illustrated in FIG. 3.

FIG. 4 provides a simplified equivalent circuit of one phase of the arrangement illustrated in FIG. 3. As in FIG. 2B, the inductance and capacitance of the winding turns other than the first few winding turns are represented by the inductor 47 and the capacitor 48, respectively. The inductor 40 represents the inductance of the first few winding turns, and the capacitor $C_{TG}$ represents the turn-to-ground capacitance of the first few winding turns. An inductor 41 represents the inductance in the connection cable resulting from the use of the ferrite ring. In FIG. 4, the dashed box surrounds those circuit elements physically located within the motor.

The inventor of the present invention has recognized that the voltage stress placed on inductor 40 is related to the magnitude of the inductor 41. As the magnitude of the inductor 41 increases, the voltage stress on the inductor 40 resulting from the application of voltage pulses to the motor decrease. Thus, by ensuring that the magnitude of the inductor 41, which represents the inductance on the connection cable resulting from the ferrite ring, is at least a desirable minimum value, it is possible to reduce the voltage stresses on the inductor 40, which represents the first few turns of the motor winding. In practice, the connection cables used to couple the motor to the electronic controller are better able to handle the voltage stresses caused by the high frequency or high dV/dt voltage pulses provided by the controller to the motor because their insulation is thicker and not exposed to such high thermal loadings as the motor itself is. Accordingly, by shifting the concentration of the voltage stresses from the first few turns of the phase winding, which are inside the motor and susceptible to voltage stress induced failure, to a location on the connection cable, which is better equipped to handle voltage stresses, it is possible to reduce the risk of winding failure of the motor.

Unlike many approaches to the voltage stress induced winding failure problems, the approach taken by the present inventor does not eliminate or reduce the voltage stresses resulting from the high frequency or high dV/dt voltage pulses. Instead, the method and apparatus of the present invention redirects the voltage stresses to a portion of the motor system better able to handle the stresses. Thus, while conventional wisdom would suggest that moving the problem to another part of the system would not reduce the number of failures suffered by the system, the present inventor has discovered that, through the use of the present invention, reduced failures for a motor system can be obtained even though the voltage stress problem on the connection cables is at least as severe as before.

Figure 5A:
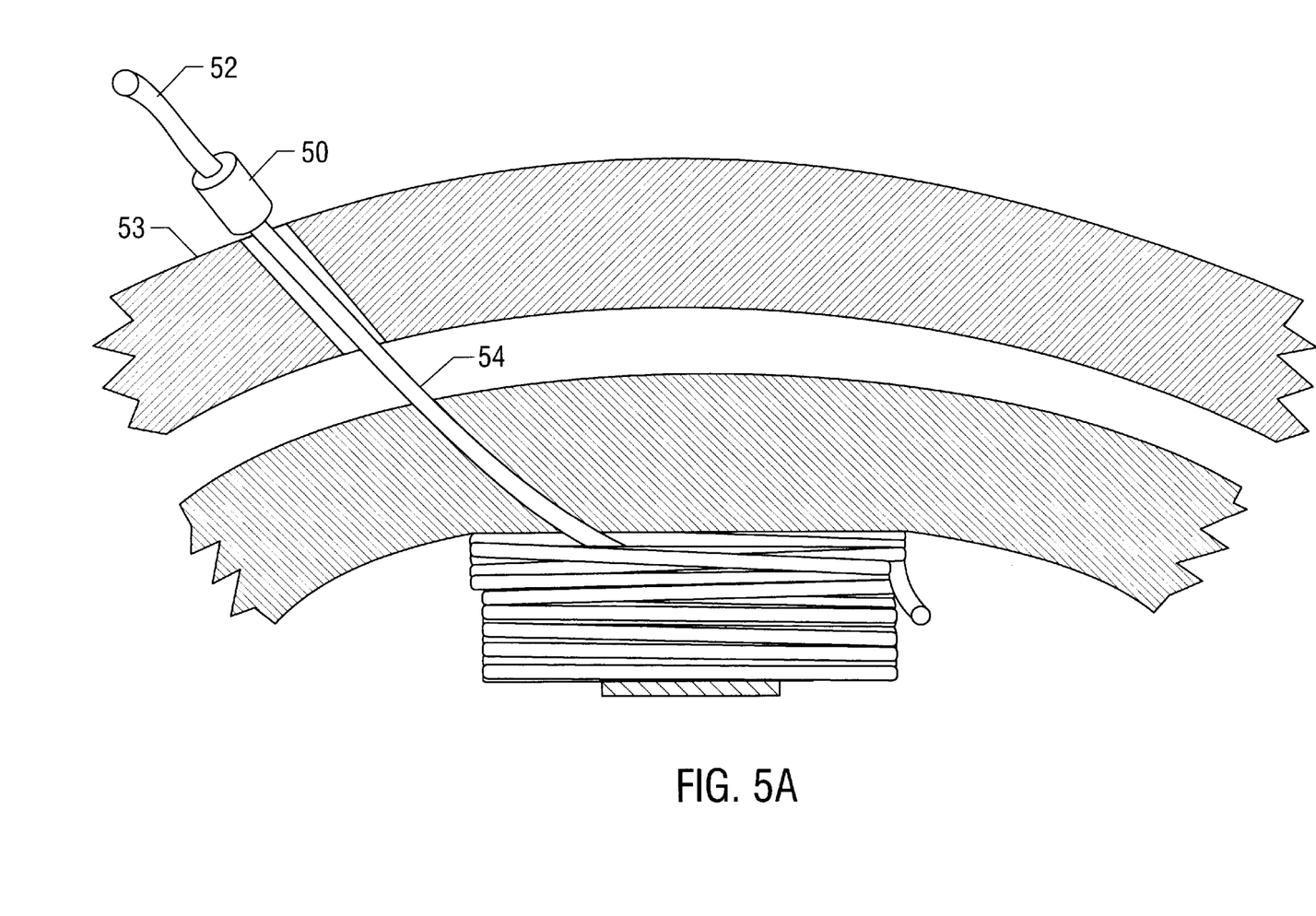
FIGS. 5A and 5B generally illustrate alternate positions for using ferrite rings to increase the inductance of a portion of a connection cable in accordance with the present invention.
Figure 5B:
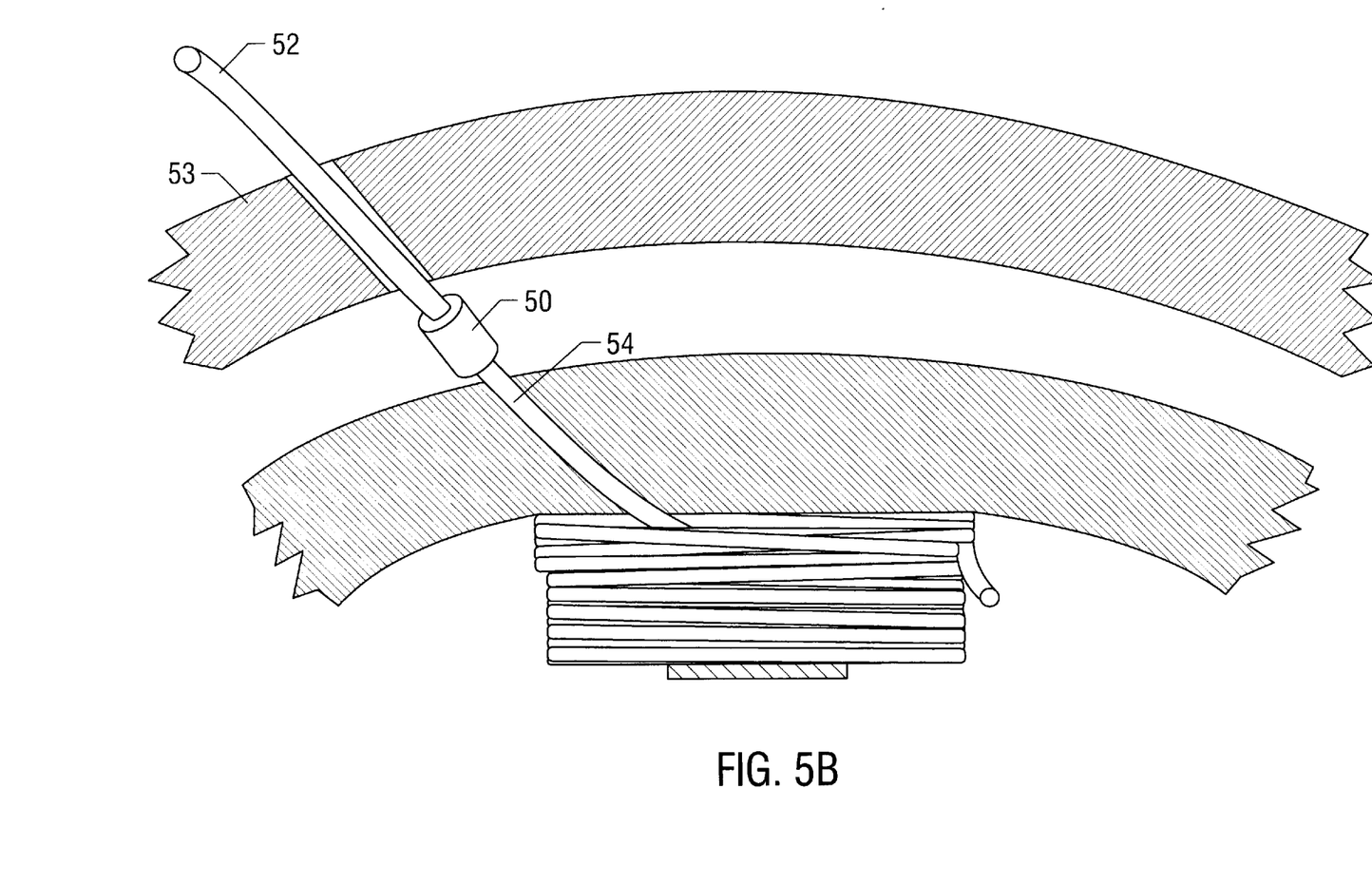
Figure 6:
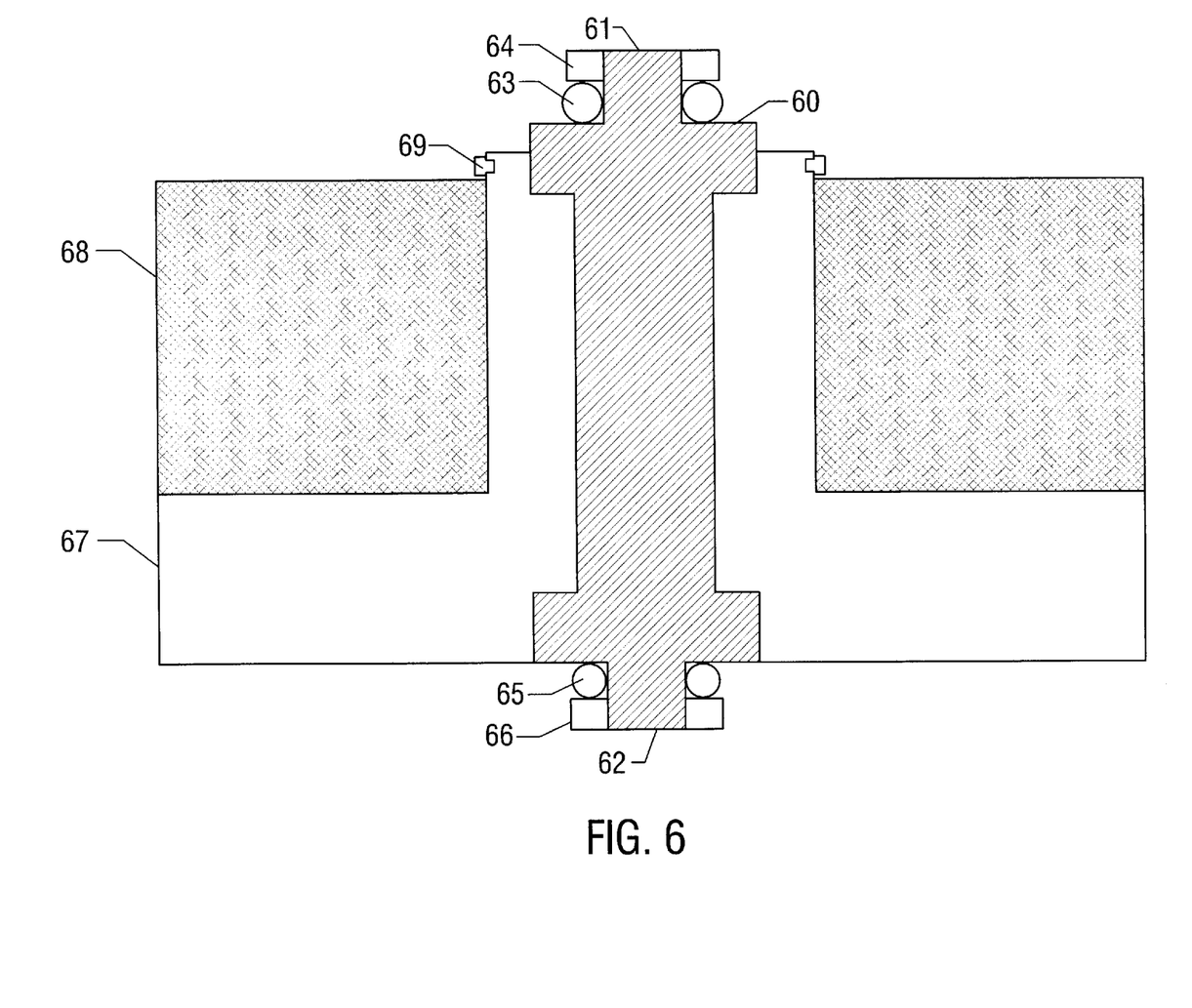
FIG. 6 generally illustrates one embodiment of the invention in which a ferrite ring is affixed around the terminal of a machine.

Although the embodiment illustrated in FIG. 3 illustrates the ferrite rings as presenting an inductance between the ends of the connection cables, it is not essential that the ferrite rings be placed in such positions. To obtain a reduction in the risk of winding failure in accordance with the present invention it is only necessary that each ring be positioned "upstream" of the motor phase winding. For example, the ferrite ring could be positioned around the flexible cable that is sometimes used to couple the connection cable to the phase winding. This is illustrated in FIGS. 5A and 5B. In FIG. 5A, a ferrite ring 50 is positioned around a portion of flexible cable 52 which is located outside the motor housing 53. The flexible cable is coupled to an end-portion 54 of the phase winding which is adapted for connection to an electronic controller. In FIG. 5B, the ferrite ring 50 is positioned around a portion of the flexible cable 52 within the motor housing. Still further embodiments are contemplated in which a ferrite ring is arranged (and perhaps affixed) around a terminal of the motor. FIG. 6 illustrates one motor terminal for one such embodiment.

In the embodiment of FIG. 6 an elongated conductive terminal 60 is provided that comprises a conductive material, such as brass or the like. The terminal 60 has two distal ends 61 and 62. Coupled to the end 61 of the terminal 60 is a terminal lead 63 from the connection cable that couples the electronic controller to the motor. The terminal lead 63 is retained in place, for example, by a nut 64. In a similar manner a terminal lead 65, electrically coupled to a phase winding in the motor, is coupled to the end 62 and retained by a nut 66. Those skilled in the art will recognize that the construction of the terminal 60 can vary, as can the method of coupling the connection cable and phase winding terminals 63, 65 to the terminal 60, without departing from the present invention.

In the embodiment of FIG. 6, the terminal 60 is molded or coupled to a molded insulator 67 which may be constructed from PBT, Phenolic or the like. The molded insulator 67 provides support for the terminal 60 and also provides a base for supporting a ferrite ring 68 that is placed around the terminal 60 within the insulator 67. As discussed above, this ferrite ring 68 substantially increases the local inductance at the motor terminal and reduces the voltage stress on the phase winding of the motor. A retaining clip 69, preferably made of non-conducting material, may be used to hold the ferrite ring 68 in place. Embodiments are contemplated in which the retaining clip is eliminated and the ferrite ring is either allowed simply to rest on the molded insulator 67 or is affixed to the molded insulator 67 by other means. It will be understood that FIG. 6 illustrates a motor terminal arrangement for only one phase winding and that multiple like motor terminal arrangements could be molded or coupled together to give the required number of terminals for the motor.

Although the sizing of the ring will, in large part, depend on the relative costs of the motor system, a few general guidelines for ring size selection may be provided. For best cost and mechanical convenience, the magnitude of the inductance produced by the ferrite ring should be at least as large as the magnitude of the inductance of the first few winding turns. Typically, these magnitudes will be of the order of about 1–10 micro-henrys depending on the size of the motor. A rule of thumb for sizing ferrite rings for switched reluctance motors is to assume that the inductance of the first few winding turns is approximately 1–3% of the phase winding inductance measured at the motor terminals. For induction motors, the percentage inductance of the first few turns to the measured phase inductance will be slightly higher.

In the above embodiments, ferrite rings are used to increase the inductance upstream of the motor winding. Other approaches, such as simply adding an inductive element in series, or winding the connection cables or flexible elements about a core, may be used to produce the desired increase in inductance between the phase windings and the machine controller. The present invention is not limited to the specific embodiments addressed herein and is intended to include all similar methods and devices for increasing the inductance between the phase windings and the machine controller.

In accordance with the present invention, it may be possible to further reduce the risk of winding failure by increasing the turn-to-ground capacitance of the motor (or turn-to-stator capacitance when the stator is not coupled to ground.) As discussed generally in connection with FIG. 2B, as turn-to-ground capacitance increases, the voltage stresses placed on an inductor upstream the capacitance increase.

In some situations it may be desirable to take affirmative action to decrease the turn-to-ground capacitance of portions of the motor. For example, U.S. patent application Ser. No. 08/473,290, entitled METHOD AND APPARATUS FOR REDUCING WINDING FAILURES IN SWITCHED RELUCTANCE MOTOR by the present inventor, discloses novel approaches for reducing the turn-to-ground of turn-to-stator capacitance of the first few winding turns to reduce the risk of winding failures in switched reluctance motors. When the method and apparatus of the present invention are used, it may be desirable to increase the machine's turn-to-ground of turn-to-stator capacitance. Such an increase in the turn-to-ground or turn-to-stator capacitance would increase the voltage stresses placed on the inductance before the phase winding and further reduce the voltage stresses that are applied to the motor winding.

Many approaches may be used to increase the turn-to-ground or turn-to-stator capacitance of the machine. Added capacitors coupled between the winding (e.g., in the terminal box of the motor) and the stator may be used to increase the turn-to-turn-to-stator capacitance. Embodiments are contemplated in which capacitors in the range of 0.5 to 10 nanofarads couple the motor phase windings to ground. The naturally high turn-to-ground or turn-to-stator capacitance of induction motors makes them particularly suitable for use with the present invention. In switched reluctance machines the first few turns of the phase winding may be positioned physically near the material of the stator at the stator pole and/or the interpole region to increase the turn-to-ground or turn-to-stator capacitance.

Figure 7:
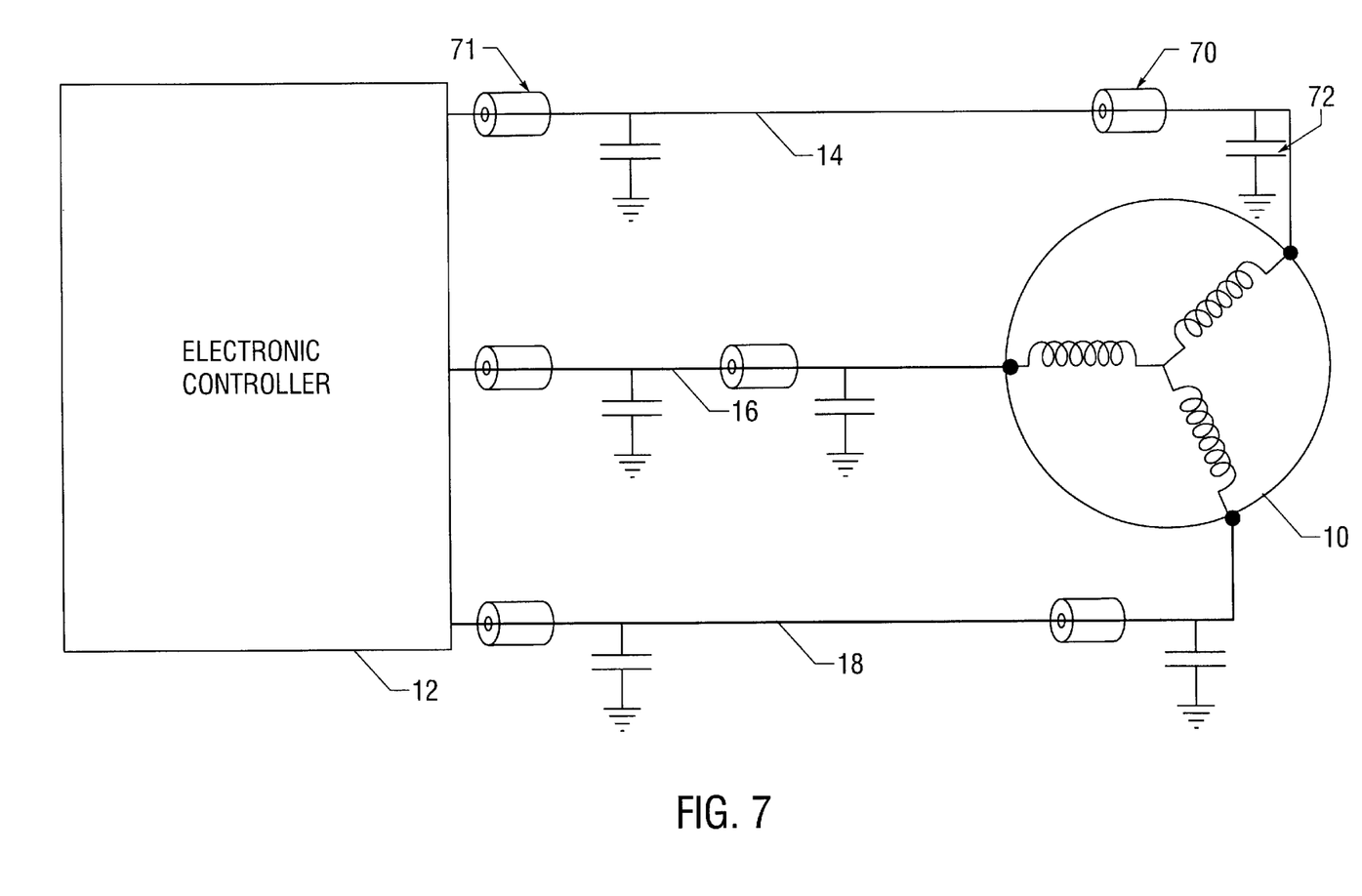
FIG. 7 generally illustrates one embodiment of the present invention where multiple inductive and capacitive members are used in combination to reduce the risk of winding failures in an electric machine.

Although the above disclosure discusses the use of a single ferrite ring and a single additional grounding capacitor for each connection cable, the invention is not so limited. In some embodiments multiple inductors and capacitors may be used in combination to reduce the risk of winding failures. One such embodiment is illustrated in FIG. 7. In FIG. 7, two ferrite rings 70 and 71 are coupled to opposite ends of a connection cable. Two capacitors 72 and 73 are provided at opposing ends of the cable to couple the cable to ground. The inductive members formed by the ferrite rings 70 and 71, along with the capacitance of the capacitors 72 and 73, form filters in which the inductance absorbs a substantial part of the steep voltage associated with the machine, and thus the magnitude of the dV/dt of the voltage across the connection cable and machine is substantially reduced. This reduction means that the voltage stress at the motor is substantially reduced. One advantage of the embodiment illustrated in FIG. 7 is that, in addition to reducing the risk of winding failures, it also tends to reduce the amount of electro-magnetic interference produced by the machine. Although the embodiment of FIG. 7 illustrates the use of capacitors 72 and 73, embodiments are contemplated in which the capacitance of the connection cable is used to form the filter.

While the invention has been described in connection with the illustrative embodiments discussed above, those skilled in the art will recognized that many variations may be made without departing from the present invention. For example, machines such as reluctance and induction machines can be constructed as a linear motor in which the moving member is often referred to as a rotor. The term 'rotor' herein is intended to embrace such moving members of linear motors. Accordingly, the above description of several embodiments is made by way of example and not for purposes of limitation. The present invention is intended to be limited only by the spirit and scope of the following claims.

What is claimed is:

1. An electric machine having a reduced risk of winding failures comprising:
    an elongate conductive terminal, the elongate conductive terminal defining first and second distal ends and a central portion between the first and second distal ends, wherein the first distal end of the conductive terminal is adapted for connection to a connection cable for coupling the electric machine to an electronic controller;
    a phase winding having at least one end electrically coupled to the second distal end of the conductive terminal; and
    a ferrite ring positioned around at least part of the central portion of the conductive terminal, wherein the ferrite ring increases the inductance of the conductive terminal.

2. The electric machine of claim 1 further comprising a insulating member positioned between the conductive terminal and the ferrite ring.

3. The electric machine of claim 2 wherein the insulating member defines a base for receiving and supporting the ferrite ring.

4. The electric machine of claim 1 wherein the inductance of the conductive terminal as increased by the ferrite ring is between 1 and 10 micro-henrys.

5. The electric machine of claim 1 wherein the inductance of the conductive terminal as increased by the ferrite ring is between 1% to 3% of the inductance of the phase winding.

6. The electric machine of claim 1 further comprising a capacitive element coupled to the phase winding for increasing the turn-to-stator capacitance of the phase winding.

7. The electric machine of claim 6 wherein the capacitive element comprises a capacitor having a first terminal coupled to the phase winding and a second terminal coupled to ground.

8. An electric machine having a reduced risk of winding failures comprising:
    a motor housing;
    a phase winding positioned within the motor housing, the phase winding defining a first end;
    a flexible, electrically conductive cable having a portion that is within the motor housing, the flexible, electrically conductive cable having a first end that is electrically coupled to the first end of the phase winding and a second end that is adapted for connection with an electronic controller; and
    a ferrite ring positioned about a portion of the flexible cable.

9. The electric machine of claim 8 wherein the ferrite ring is positioned about a portion of the flexible, electrically conductive cable that is within the motor housing.

10. The electric machine of claim 8 wherein the ferrite ring increases the inductance of the portion of the flexible, electrically conductive cable about which the ring is position to a value between 1 micro-henrys to 10 micro-henrys.

11. The electric machine of claim 8 wherein the inductance of the portion of the flexible, electrically conductive cable about which the ring is position as increased by the ferrite ring is between 1% to 3% of the inductance of the phase winding.

12. A method of reducing the risk of winding failures in an electric machine including a phase winding and a motor terminal coupled to the phase winding, the motor terminal defining a given inductance, the method comprising the act of:
    positioning an insulating member about the motor terminal; and positioning an inductive member about the insulating member such that the inductance of the combination of the motor terminal, the insulating member, and the inductive member is greater than the given inductance of the motor terminal.

13. The method of claim 12 further comprising the act of sizing the inductive member such that the total inductance of the combination of the motor terminal, the insulating member, and the inductive member is greater than 1 microhenrys.

14. The method of claim 12 wherein the insulating member defines a base for receiving the inductive member, further comprising the act, of coupling the inductive member to the insulating member with a non-conductive element.

15. The method of claim 12 wherein the act of positioning an inductive member about the insulating member comprises the act of positioning a ferrite ring about the insulating member.

16. The method of claim 12 wherein the phase winding defines a turn-to-ground capacitance, further comprising the act of coupling a capacitive element between the phase winding and ground to increase the turn-to-ground capacitance of the phase winding.

* * * * *

UNITED STATES PATENT AND TRADEMARK OFFICE
CERTIFICATE OF CORRECTION

PATENT NO. : 6,081,080
DATED : June 27, 2000
INVENTOR(S) : Rex Mountford Davis

It is certified that error appears in the above-identified patent and that said Letters Patent is hereby corrected as shown below:

Title page,
Foreign Application Priority Date:

Please delete Application No. 9507445 and insert therefore -- 9507445.6 --.

References Cited:
U.S. Patent Documents:

Please insert the following reference: -- 5,309,052, 05/94, Kim, 310/51 --.

Foreign Patent Documents:

Please insert the following references: -- 401,782, 11/33, Great Britain --; and -- 1,021,274, 03/66, Great Britain --.

Column 4,
Lines 53-55, delete "METHOD AND APPARATUS FOR REDUCING WINDING FAILURES IN SWITCHED RELUCTANCE MOTORS," filed Jun. 7, 1996" and insert therefore -- METHOD AND APPARATUS FOR REDUCING VOLTAGE STRESS IN SWITCHED RELUSTANCE MOTORS, FILED Jun. 7, 1995 --.

Column 7,
Lines 9-11, delete "METHOD AND APPARATUS FOR REDUCING WINDING FAILURES IN SWITCHED RELUCTANCE MOTORS," filed Jun. 7, 1996" and insert therefore -- METHOD AND APPARATUS FOR REDUCING VOLTAGE STRESS IN SWITCHED RELUSTANCE MOTORS, FILED Jun. 7, 1995 --.

UNITED STATES PATENT AND TRADEMARK OFFICE
CERTIFICATE OF CORRECTION

PATENT NO.    : 6,081,080
DATED         : June 27, 2000
INVENTOR(S)   : Rex Mountford Davis It is certified that error appears in the above-identified patent and that said Letters Patent is hereby corrected as shown below:

Claim 10,
Line 54, delete "position" and insert therefore -- positioned --;

Claim 11,
Line 58, delete "position" and insert therefore -- positioned --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*